US012625230B2

(12) United States Patent
van Houtum et al.

(10) Patent No.: US 12,625,230 B2

(45) Date of Patent: May 12, 2026

---

(54) SIGNAL PROCESSING FOR OFDM RADAR SYSTEMS

(71) Applicant: NXP B.V., Eindhoven (NL)

(72) Inventors: Wilhelmus Johannes van Houtum, Sint-oedenrode (NL); Vinicius Oliari Couto Dias, Eindhoven (NL)

(73) Assignee: NXP B.V., Eindhoven (NL)

( * ) Notice: Subject to any disclaimer, the term of this patent is extended or adjusted under 35 U.S.C. 154(b) by 383 days.

(21) Appl. No.: 18/368,614

(22) Filed: Sep. 15, 2023

(65) Prior Publication Data

US 2025/0093461 A1     Mar. 20, 2025

(51) Int. Cl.
    *G01S 7/282*        (2006.01)
    *H04L 5/00*         (2006.01)
(52) U.S. Cl.
    CPC ............ *G01S 7/282* (2013.01); *H04L 5/0007* (2013.01); *H04L 5/0098* (2013.01)
(58) Field of Classification Search
    CPC .......... G01S 7/003; G01S 7/006; G01S 7/023; G01S 7/282; G01S 7/35; H04L 25/0202; H04L 25/022; H04L 27/26132; H04L 27/2647; H04L 5/0007; H04L 5/0048; H04L 5/0098; H04L 5/14
    See application file for complete search history.

(56) References Cited

U.S. PATENT DOCUMENTS

| | | | | |
|---|---|---|---|---|
| 10,955,547 | B2 * | 3/2021 | Ray | .......................... G01S 7/003 |
| 12,339,387 | B2 * | 6/2025 | Kumari | ................. G01S 13/003 |

| | | | | |
|---|---|---|---|---|
| 2005/0157802 | A1 * | 7/2005 | Park | .................... H04L 27/2647 375/348 |
| 2012/0146844 | A1 * | 6/2012 | Stirling-Gallacher | ...................... G01S 13/343 342/189 |
| 2013/0342387 | A1 * | 12/2013 | Zwick | ................... G01S 13/003 342/202 |
| 2016/0334501 | A1 * | 11/2016 | Ling | ...................... G01S 13/931 |
| 2018/0331751 | A1 * | 11/2018 | Antonik | ............... H04B 7/0669 |
| 2019/0293748 | A1 * | 9/2019 | Gulati | ..................... G01S 7/023 |
| 2019/0305999 | A1 * | 10/2019 | Ling | ........................ G01S 13/89 |
| 2019/0383925 | A1 * | 12/2019 | Gulati | ................. H04J 13/0062 |
| 2019/0391247 | A1 * | 12/2019 | Gulati | .................. G01S 13/341 |
| 2020/0033442 | A1 * | 1/2020 | Gulati | .................. G01S 7/0234 |

(Continued)

FOREIGN PATENT DOCUMENTS

| | | |
|---|---|---|
| WO | 2023011560 A1 | 2/2023 |
| WO | 2023164342 A1 | 8/2023 |

OTHER PUBLICATIONS

Hakobyan, Gor, "Orthogonal Frequency Division Multiplexing Multiple-Input Multiple-Output Automotive Radar with Novel Signal Processing Algorithms", Feb. 7, 2018, 188 pages.

(Continued)

*Primary Examiner* — Peter M Bythrow

(57)        ABSTRACT

In implementations of signal processing for OFDM radar systems, an OFDM transceiver of an ISAC system is operated in full-duplex mode in a downlink communication phase. The ISAC system generates sensing symbols for an OFDM radar system by combining OFDM communication symbols and repetitions of the OFDM communication symbols as the sensing symbols. The OFDM transceiver attenuates subcarriers of received sensing symbols for processing by the OFDM radar system to increase a signal-to-noise ratio of the received sensing symbols.

18 Claims, 7 Drawing Sheets

(56) References Cited

U.S. PATENT DOCUMENTS

| | | | | |
|---|---|---|---|---|
| 2020/0124700 | A1* | 4/2020 | Bourdoux | H04L 5/001 |
| 2020/0319327 | A1* | 10/2020 | Tsvelykh | G01S 13/933 |
| 2021/0041530 | A1* | 2/2021 | Jeong | G01S 13/325 |
| 2021/0382160 | A1* | 12/2021 | Schindler | G01S 7/352 |
| 2022/0236403 | A1* | 7/2022 | Schweizer | G01S 13/751 |
| 2022/0404456 | A1* | 12/2022 | Gottinger | G01S 7/354 |

OTHER PUBLICATIONS

Sit, Y.L. et al., "Direction of Arrival Estimation using the MUSIC Algorithm for a MIMO OFDM Radar", 2012 IEEE Radar Conference; May 7, 2012; pp. 0226-0229.
Tigrek, R.F. et al., "Solving Doppler Ambiguity by Doppler Sensitive Pulse Compression Using Multi-Carrier Waveform", IEEE 2008 European Radar Conference; Oct. 30, 2008; pp. 72-75.

* cited by examiner

200

400

406

402

404

SIGNAL PROCESSING FOR OFDM RADAR SYSTEMS

BACKGROUND

Integrated sensing and communication (ISAC) systems leverage wireless communication systems and sensor systems to facilitate both communications and radar sensing such that information collected from the radar sensing systems can be efficiently communicated to other devices or systems via the communication systems. When performing ISAC, there is typically at least some trade-off between the sensing and communication applications. For example, utilization of sensing symbols for radar sensing is additional overhead for the communications systems. In another trade-off example, techniques for reducing this overhead for the communications systems can introduce a low target signal-to-noise ratio for target estimation in the sensing systems.

SUMMARY OF EMBODIMENTS

The present disclosure may be better understood in view of the following examples, considered individually or in various combinations.

Example 1: A method comprising: operating, by an integrated sensing and communication (ISAC) system, an orthogonal frequency division multiplication (OFDM) transceiver in full-duplex mode in a downlink communication phase; generating, by the ISAC system, sensing symbols for an OFDM radar system by combining communication symbols and repetitions of the communication symbols as the sensing symbols.

Example 2: The method of Example 1, further comprising: attenuating, by the OFDM transceiver in the full-duplex mode, subcarriers of received sensing symbols for processing by the OFDM radar system to increase a signal-to-noise ratio of the received sensing symbols.

Example 3: The method of Example 1, wherein attenuating the subcarriers removes the subcarriers from the received sensing symbols.

Example 4: The method of Example 1, wherein the subcarriers are attenuated at one or both of a transmitter and a receiver of the OFDM transceiver.

Example 5: The method of Example 1, wherein the subcarriers are attenuated and complex conjugate multiplication (CCM) is used to obtain channel information.

Example 6: The method of Example 5, wherein the subcarriers are attenuated based on having amplitudes that are greater than a high amplitude threshold.

Example 7: The method of Example 1, wherein the subcarriers are attenuated and spectral division (SD) is used to obtain channel information.

Example 8: The method of Example 7, wherein the subcarriers are attenuated based on having amplitudes that are less than a low amplitude threshold.

Example 9: The method of Example 1, further comprising: processing the received sensing symbols based on minimum mean square error (MMSE) estimation.

Example 10: An ISAC system comprising: an OFDM radar system configured to process sensing symbols generated by combining communication symbols and repetitions of the communication symbols as the sensing symbols; and an OFDM transceiver configured to: operate in full-duplex mode in a downlink communication phase.

Example 11: The ISAC system of Example 10, wherein the OFDM transceiver is further configured to: attenuate subcarriers of received sensing symbols for processing by the OFDM radar system to increase a signal-to-noise ratio of the received sensing symbols.

Example 12: The ISAC system of Example 10, wherein the subcarriers are attenuated at one or both of a transmitter and a receiver of the OFDM transceiver.

Example 13: The ISAC system of Example 10, wherein the subcarriers are attenuated using CCM based on having amplitudes that are greater than a high amplitude threshold.

Example 14: The ISAC system of Example 10, wherein the subcarriers are attenuated using SD based on having amplitudes that are less than a low amplitude threshold.

Example 15: The ISAC system of Example 10, wherein attenuating the subcarriers removes the subcarriers from the received sensing symbols.

Example 16: The ISAC system of claim 10, wherein the OFDM radar is configured to process the received sensing symbols based on MMSE estimation.

Example 17: A non-transitory computer-readable medium storing a set of executable instructions, the set of executable instructions to manipulate at least one processor to: operate an OFDM transceiver of an ISAC system in full-duplex mode in a downlink communication phase; generate sensing symbols for an OFDM radar system of the ISAC system by combining communication symbols and repetitions of the communication symbols as the sensing symbols; and attenuate subcarriers of received sensing symbols for processing by the OFDM radar system to increase a signal-to-noise ratio of the received sensing symbols.

Example 18: The non-transitory computer-readable medium of Example 17, wherein the subcarriers are attenuated using CCM based on having amplitudes that are greater than a high amplitude threshold.

Example 19: The non-transitory computer-readable medium of Example 17, wherein the subcarriers are attenuated using SD based on having amplitudes that are less than a low amplitude threshold.

Example 20: The non-transitory computer-readable medium of Example 17, wherein the set of executable instructions are configured to further manipulate the at least one processor to: process the received sensing symbols based on MMSE estimation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
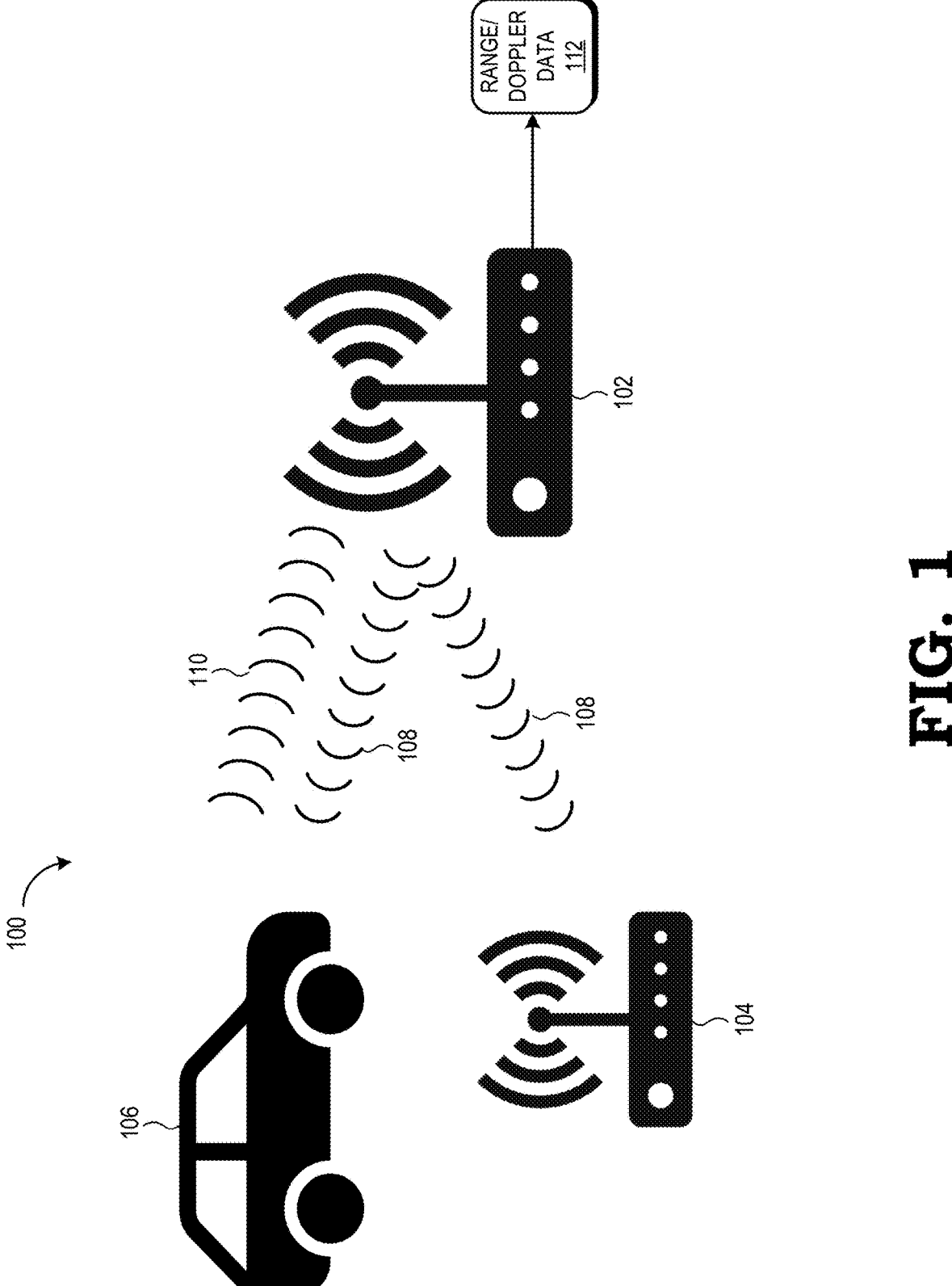
FIG. 1 is a diagram illustrating an ISAC or joint communication and sensing (JCAS) system utilizing OFDM signaling for both communications and radar sensing in accordance with some embodiments.

ISAC systems are capable of facilitating both communications and radar sensing such that information collected from the radar sensing can be efficiently communicated to other devices or systems. For example, an ISAC system that includes a base station utilizing range and Doppler measurements as part of a radar sensing system estimates distances and velocities of objects (e.g., pedestrians) in a local environment, and then the ISAC system communicates the estimated distances and velocities to an autonomous vehicle via a communications system. In this example, the autonomous vehicle receives and processes the communicated information to improve adaptive cruise control, collision warning functionalities, and the like.

An ISAC system includes a transmitting device that generates and transmits an OFDM signal representing a sequence of OFDM symbols, which in turn represent a set of communication data. The OFDM signal (bitstream) representing the communication data is divided into multiple streams, and multiple orthogonal subcarrier signals with overlapping spectra are also transmitted, with each carrier modulated with symbols from the incoming stream so multiple symbols are being transmitted in parallel. The OFDM signal is received at a receiving device, which processes the OFDM signal to extract the set of communication data represented by the OFDM signal. The OFDM signal is also scattered by at least one object in the local environment of the transmitting device. The receiving device thus may also receive the scattered OFDM signal and extract the OFDM symbols represented in the scattered OFDM signal. By comparing the differences between the originally transmitted OFDM symbols and the received OFDM symbols, the transmitting device can estimate the distance and speed of the object.

When implementing ISAC systems, there are usually some trade-offs between the sensing and communication applications. In an example of these trade-offs, symbols that are reserved for radar sensing cannot also be used for communications, so fewer symbols (and, by extension, data) are available for communications. In another trade-off example, techniques for reducing this overhead for the communications systems can introduce a low target signal-to-noise ratio for target estimation in the sensing systems.

In order to overcome the limitations of conventional ISAC systems, in some embodiments a repetition of a communication symbol is used as the sensing symbol, thus freeing up more symbols for to be used as communication symbols. In some embodiments, particular subcarriers are attenuated at a transmitter and/or at a receiver of a OFDM transceiver of an ISAC system. In an example, the particular subcarriers are attenuated by setting to zero the particular subcarriers or by designing subcarrier symbols such that the subcarrier symbols do not exhibit relatively small and/or relatively large energy values. In this example, first techniques for CCM or SD are applied.

In the case of CCM, subcarriers with relatively high amplitude are set to zero to avoid amplification of noise terms and distortions on the channel estimation. The CCM case is referred to as optimized CCM (OCCM). In the case of SD, subcarriers with relatively low energy and/or relatively high energy are set to zero to avoid amplification of noise terms. The SD case is referred to as optimized SD (OSD).

A second technique utilizing MMSE methods is combined with the first techniques resulting in optimized MMSE (OMMSE). In accordance with some embodiments of the second technique, if noise power is high, then estimation tends to CCM, and if noise power is low, then estimation tends to SD. Evaluations of OSD, OCCM, and OMMSE demonstrate similar performance to conventional techniques, and removal of subcarriers to be processed can result in an overall reduction in complexity.

FIG. 1 illustrates an example ISAC or JCAS system 100 (referred to herein as the ISAC system 100) utilizing integrated or concurrent radar sensing and communication with repetition of communication symbols as sensing symbols and attenuation of subcarriers in accordance with some embodiments. The ISAC system 100 includes an ISAC device 102 employing OFDM signaling for both transmission of data to at least a second device 104 and for radar sensing of objects, such as object 106, in a local environment of the ISAC device 102. To illustrate, the ISAC system 100 may be a cellular system in which the ISAC device 102 is a base station and the device 104 is a user equipment (UE), with the base station utilizing OFDM signaling to communicate data to the UE in accordance with, for example, a Fourth Generation Long Term Evolution (4G LTE) cellular protocol or a Third Generation Partnership Protocol (3GPP) Fifth Generation New Radio (5G NR) protocol, while also attempting to sense the range and velocity of objects in the local environment utilizing the same OFDM signaling. Alternatively, the ISAC device 102 could be the UE and the device 104 the base station. As yet another example, the ISAC system 100 could be a wireless local area network (WLAN) system using OFDM-based IEEE 802.11 wireless transmissions to communicate data with the device 104 in the form of a UE, while also using the same OFDM signaling to sense objects in the local environment.

In operation, the ISAC device 102 converts a set of data for transmission to the device 104 to a sequence of one or more OFDM symbols, which is then converted to an analog signal that is modulated with a carrier frequency signal to generate a radio frequency (RF) signal 108, which is emitted by the ISAC device 102 and propagated through the local environment. The device 104 receives the emitted RF signal 108 and processes the RF signal 108 to extract the set of data for further processing. Further, the emitted RF signal 108 is scattered by objects in the local environment, such as object 106 (e.g., a vehicle). The resulting scattered RF signal 110 is propagated to the ISAC device 102, whereupon the ISAC device 102 processes the scattered RF signal 110 to determine either or both of a range (distance) or a velocity of the object 106 relative to the ISAC device 102 (as range/doppler data 112) using the techniques described herein. The range/doppler data 112 then may be used by the ISAC device 102 to modify one or more of its operations. For example, the range/doppler data 112 may inform the ISAC device 102 of a relative location of an interfering object, in response to which the ISAC device 102 may modify one or more of its transmission parameters, such as transmission power, beam direction, etc., to compensate for the interfering object. As another example, the ISAC device 102 may be a vehicle that implements some form of autonomous driving, and the relative distance and speed of objects identified in the range/doppler data 112 may inform one or more driving operations of the vehicle. Still further, the ISAC device 102 may transmit the range/doppler data 112 to other devices for their own use.

Figure 2:
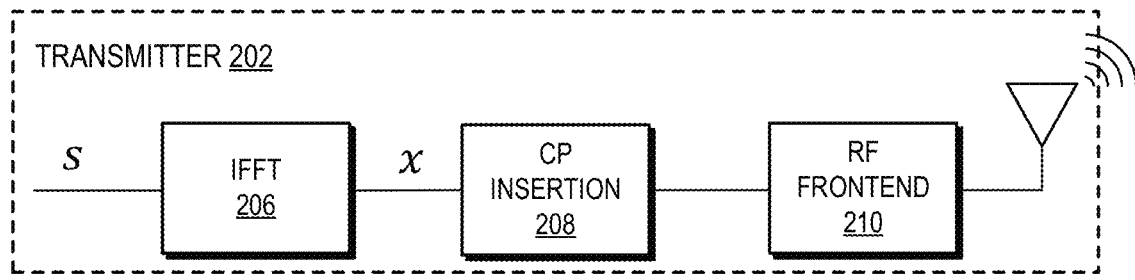
FIG. 2 is a diagram illustrating an OFDM transceiver of an ISAC system in accordance with some embodiments.
Figure 2:
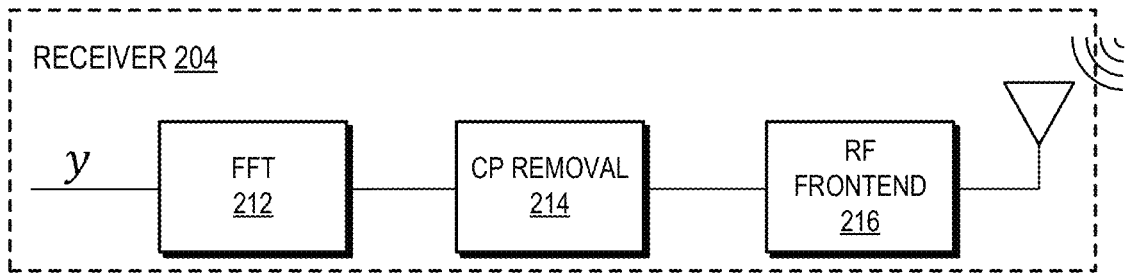

FIG. 2 illustrates an example OFDM transceiver 200 of an ISAC system in accordance with some embodiments. The ISAC system is capable of implementing or facilitating wireless communications and sensing applications including radar sensing, and the OFDM transceiver 200 includes an OFDM transmitter path 202 ("transmitter 102") and an OFDM receiver path 204 ("receiver 204"). The ISAC system operates the OFDM transceiver 200 in full duplex mode in a downlink communication phase in accordance with some embodiments. In other words, the OFDM both transmits and receives data simultaneously in a downlink communication phase.

The transmitter 202 is illustrated to include symbols S such as sensing symbols which are represented in a first domain (e.g., a frequency domain). An inverse fast Fourier transform (IFFT) component 206 of the transmitter 202 represents symbols x such as the sensing symbols in a second domain (e.g., a time domain). The transmitter 202 also includes a cyclic prefix (CP) insertion component 208 and a RF frontend 210 in accordance with some embodiments.

The receiver 204 is illustrated as including received subcarriers y. In an example, the received subcarriers y can be described as:

$$y = h \cdot s + n$$

where h represents a frequency channel response (e.g., carrying range-Doppler information) and n represents noise in the frequency domain.

The receiver 204 also includes a fast Fourier transform (FFT) component 212, a CP removal component 214, and an RF frontend 216. The RF frontends 210 and 216 are typically implemented using well-known RF hardware, such as digital-to-analog converters (DACs), signal generators, modulators/mixers, low pass filters (LPFs), antenna arrays, and the like. The components 206, 208, 212, and 214 each may be implemented as hardcoded logic, one or more processors executing software, programmable logic, or combinations thereof.

Figure 3:
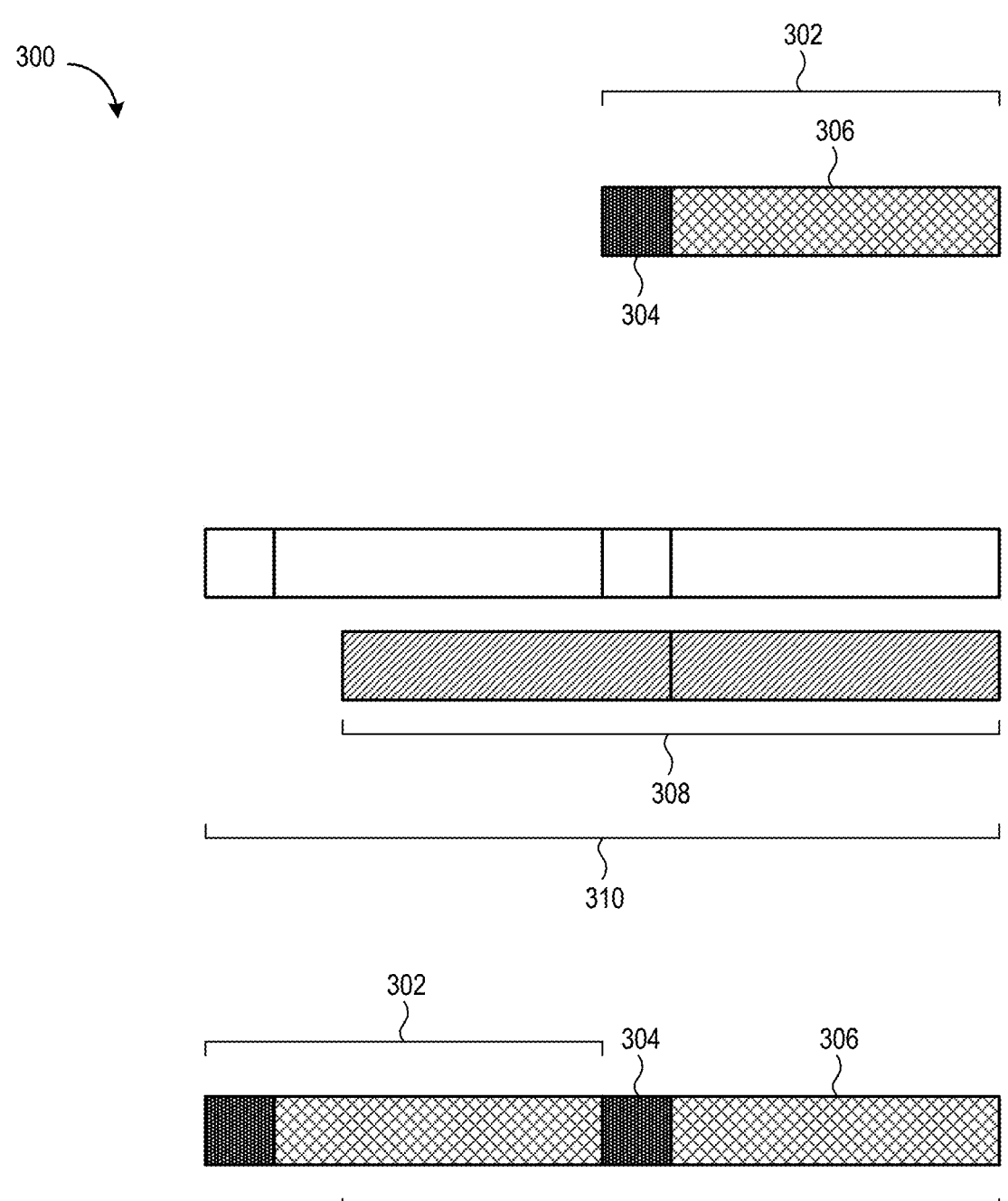
FIG. 3 is a diagram illustrating an OFDM communication symbol combined with a repetition of the OFDM communication symbol as a sensing symbol in accordance with some embodiments.

FIG. 3 illustrates an example 300 of an OFDM communication symbol combined with a repetition of the OFDM communication symbol as a sensing symbol in accordance with some embodiments. The example 300 is illustrated to include an OFDM communication symbol 302 which has a length of C 304+N 306 where N is the FFT size and C is the CP size. In accordance with some embodiments, C≤N and typically C<<N. In order to estimate up to a maximum unambiguous distance for OFDM radar sensing (e.g., totaling 2N samples 308), a signal with N samples followed by the same signal with N samples can be utilized. In a scenario in which a sensing symbol is not a communication symbol, two OFDM symbols 310 are reservable in order to reserve 2N samples 308 which is referred to as a standard sensing symbol.

If the previous OFDM communication symbol 302 is repeated to include 2N+2C samples (e.g., two OFDM symbols 310), then 2N samples 308 (e.g., 2N consecutive samples) are extractable with the first N samples being a repetition of the next N samples. In this scenario, these 2N consecutive samples are usable as a sensing symbol while only one OFDM communication symbol 302 is reserved for sensing (which is a repetition of the OFDM communication symbol 302).

Returning to the example in which the received subcarriers y are describable as:

$$y = h \cdot s + n$$

In accordance with some embodiments, two example techniques are described for extracting the channel information h. In the first example technique, CCM of the transmitted N samples of sensing subcarriers in the frequency domain by y is representable as:

$$\hat{h} = y \cdot s^* = h|s|^2 + s^* n$$

where variations in the amplitude of the transmitted subcarriers s affect both the channel estimation $\hat{h}$ and the noise n, which is suboptimal in scenarios with high signal-to-noise ratios.

In the second example technique, SD is utilized to divide the received subcarriers y by the transmitted subcarriers s in the frequency domain which is describable as:

$$\hat{h} = \frac{y}{s} = h + \frac{n}{s}$$

where relatively small amplitudes of s can enhance the noise n, which is suboptimal in scenarios with low signal-to-noise ratios.

Figure 4:
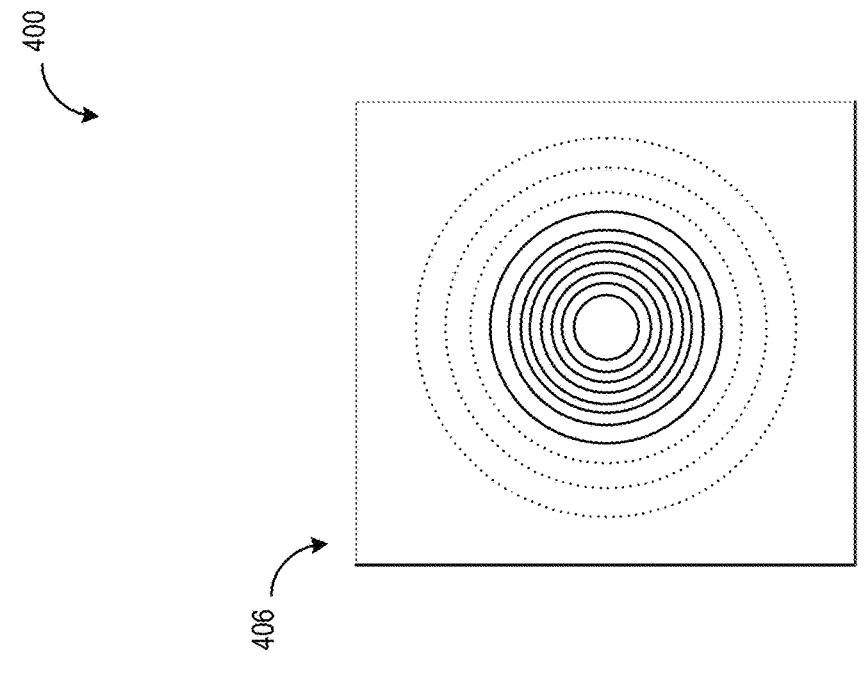
FIG. 4 is a diagram illustrating attenuated subcarriers for processing by an OFDM radar system to improve a signal-to-noise ratio for target estimation in accordance with some embodiments.
Figure 4:
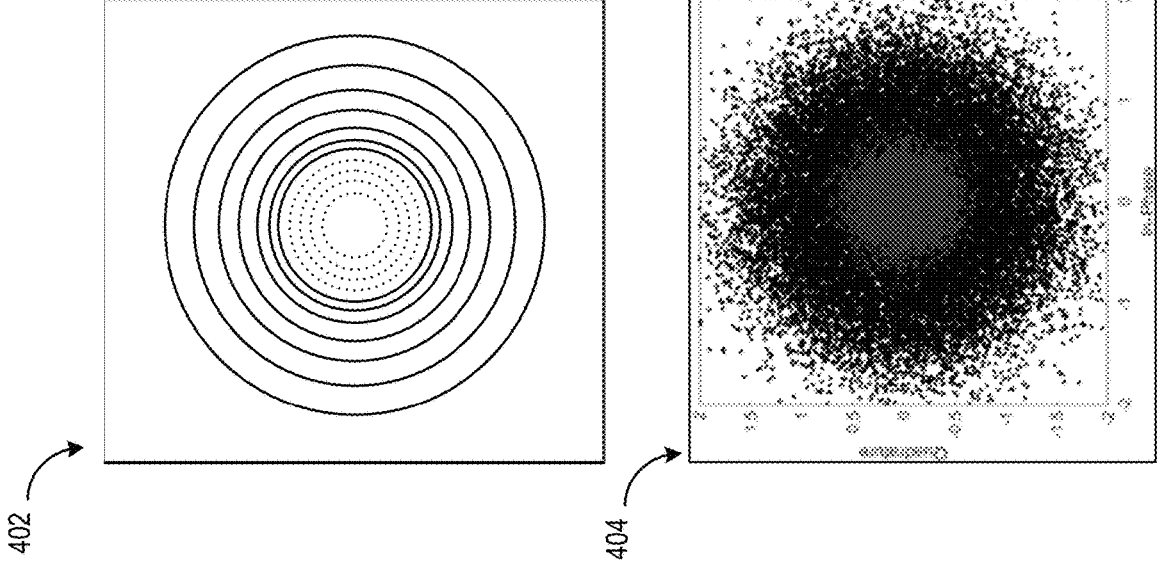

FIG. 4 illustrates examples of attenuated subcarriers 400 for processing by an OFDM radar system to improve a signal-to-noise ratio for target estimation in accordance with some embodiments. In a first attenuation technique, particular subcarriers are set to zero (or a small value) at the transmitter 202 and/or at the receiver 204. Alternatively, at the transmitter 202, instead of setting particular subcarriers to zero, it is possible to design subcarrier symbols such that the subcarrier symbols do not exhibit relatively small and/or relatively large energy values. In either alternative, the first attenuation technique applies SD or CCM.

The examples of attenuated subcarriers 400 include a representation 402 of inner transmitter 202 subcarriers set to zero; a representation 404 of inner receiver 204 subcarriers set to zero; and a representation 406 of outer transmitter 202 subcarriers set to zero. In the case of CCM, the subcarriers with relatively high amplitude (e.g., outer rings) are set to zero to avoid amplification of the noise term s*n. This CCM case is referred to as optimized CCM (OCCM).

In the case of SD, the subcarriers with relatively low energy (e.g., inner rings) are set to zero to avoid amplification of the noise term n/s. Examples of low energy symbols set to zero at the transmitter 202 and at the receiver 204 are illustrated in the representations 402 and 404, respectively. This SD case is referred to as optimized SD (OSD).

In a second attenuation technique, MMSE methods are combined with the first attenuation technique which is referred to OMMSE. The estimation $\hat{h}$ by a pure MMSE is describable as:

$$\hat{h} = y \cdot \frac{s^*}{|s|^2 + \frac{\sigma_n^2}{\sigma_s^2}}$$

where if the noise power is relatively high, then $\hat{h}$ tends to follow CCM and avoids division of y by relatively small values of s; if the noise power is relatively low, then $\hat{h}$ tends to SD and avoids variations on the estimation amplitudes of h by $|s|^2$; and in an example scenario in which no subcarriers are set to zero when applying OMMSE, then the method reduces to MMSE.

Figure 5:
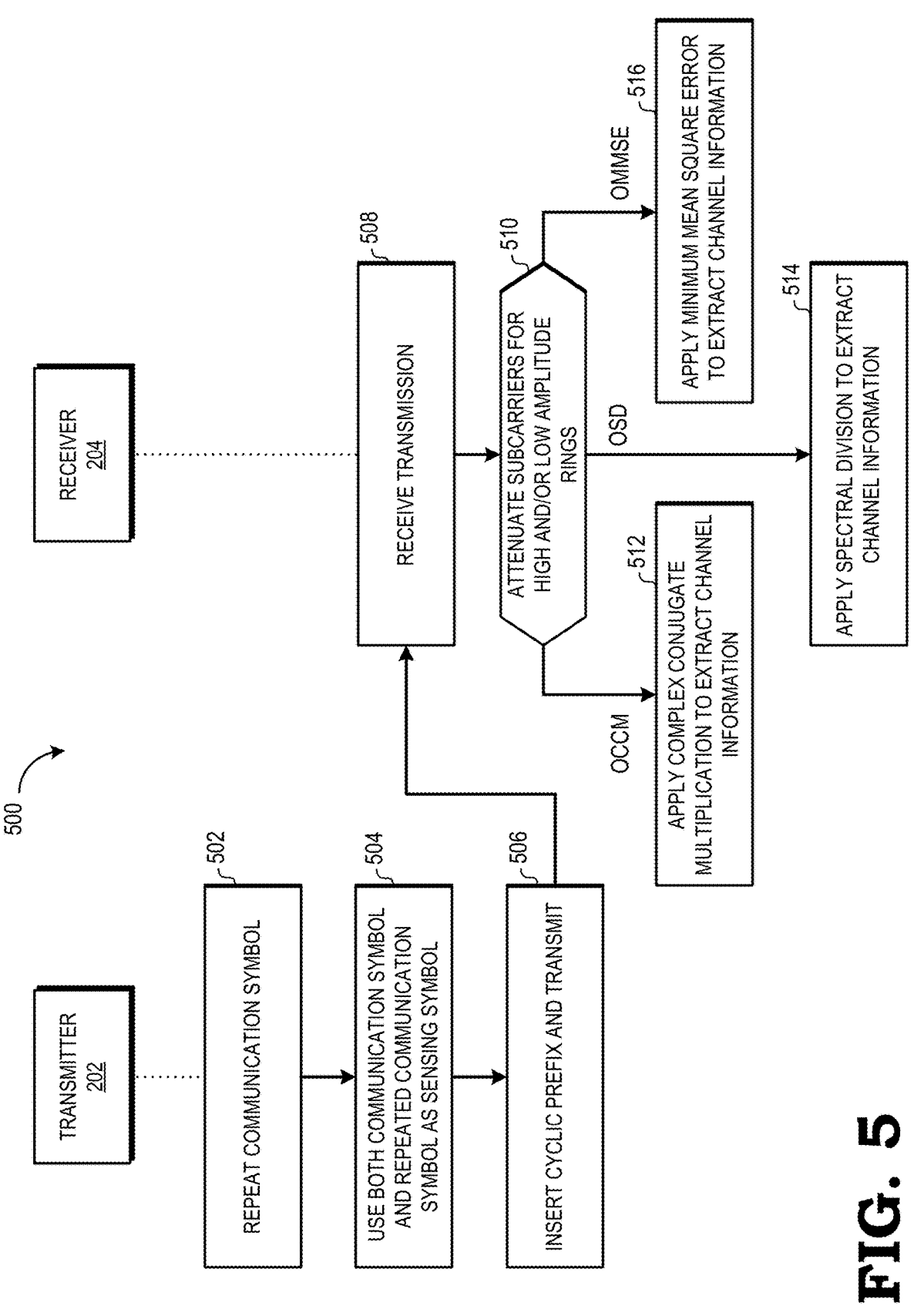
FIG. 5 is a flow diagram of a method of repeating communication OFDM symbols to compose sensing symbols and removing data information from received sensing symbols in accordance with some embodiments.

FIG. 5 is a flow diagram of a method 500 of repeating communication OFDM symbols to compose sensing symbols and removing data information from received sensing symbols in accordance with some embodiments. The method 500 of FIG. 5 illustrates a general overview of the operation of the ISAC device 102 of FIGS. 1 and 2. At startup or for the initiation of the process for transmission of an OFDM frame containing OFDM symbols representing communication data, the transmitter 202 transmits an OFDM-based RF signal that serves two purposes: as a carrier of communications data for receipt by another device; and as a radar signal for radar sensing. As such, the transmitter 202 receives a data input in the form of a sequence of symbols representing communication data (e.g., from an application executing at the ISAC device 102) and from this data input generates, based on OFDM principles, an RF signal (e.g., RF signal 108, FIG. 1) that is emitted into the local environment. For radar sensing, the ISAC device 102 repurposes a portion of the receiver path along with use of the radar sensing path, to perform radar processing on RF signaling received via the receiver path as a result of scattering/reflection of RF signaling concurrently transmitted by the transmitter path.

Starting with the transmission process, at block 502, an input of transmission bits of a data stream is received and encoded into a data symbol on which the IFFT component 206 performs an IFFT, resulting in an OFDM symbol. The transmitter 202 repeats the OFDM communication symbol at block 502, and at block 504, the transmitter 202 uses both the OFDM communication symbol and the repeated OFDM communication symbol as a sensing symbol.

After the IFFT process, at block 506 the CP insertion component 208 appends (or prepends) a CP to each OFDM symbol. Typically, the CP is a copy of an end portion of the OFDM symbol so that a receiver receiving the resulting RF signal will be able to integrate over an integer number of sinusoid cycles for each of the multipaths when the receiver performs OFDM demodulation with a FFT.

Following CP insertion, the OFDM symbol vector is provided to the RF frontend 210 of the transmitter path 202, whereupon the OFDM symbol vector is converted to analog signaling by a digital-to-analog (D/A) converter (not shown), the analog signaling is low-pass filtered by a low-pass filter (not shown), and the resulting filtered analog signaling is then modulated with a carrier signal having a frequency $f_c$ to generate an RF signal 108 emitted into the local environment by an antenna array of the RF frontend 210. The RF signal 108 then propagates one or more receiving devices (e.g., device 104, FIG. 1), whereupon each receiving device processes the RF signal 108 to recover the original N symbols.

Concurrent with the generation and transmission of the RF signal 108, the receiver 204 operates to generate a radar profile of the local environment using scattering/reflection of the RF signal by objects in the local environment. Accordingly, at block 508, the receiver path 204 is activated concurrent with transmission so as to receive scattered representation(s) of the RF signal 108 for radar sensing purposes. For example, when the RF signal 108 encounters an object 106 (FIG. 1) in the local environment, the object 106 scatters the RF signal 108, resulting in a scattered RF signal 110 propagating back to the ISAC device 102 and being received at the RF frontend 216 of the receiver path 204. The RF frontend 216 converts the scattered RF signal 110 from an analog signal to a digital signal, which is parallelized into N channels, with each channel representing a recovered symbol and a corresponding appended CP.

At block 510, the CP removal component 214 removes the CPs and component 212 applies an FFT. Also at block 510, some high and/or low amplitude subcarriers are attenuated. For example, in some embodiments, if the receiver 204 applies CCM to obtain the channel estimation $\hat{h}$, the receiver 204 sets rings having an amplitude above a first threshold to zero (or a small value) to avoid amplification of the noise term s*n. In some embodiments, if the receiver 204 applies SD to obtain the channel estimation $\hat{h}$, the receiver 204 sets rings having an amplitude below a second threshold to zero (or a small value) to avoid amplification of the noise term n/s. If the receiver 204 applies CCM to obtain the channel estimation $\hat{h}$, the method flow continues to block 512, representing OCCM. If the receiver applies SD to obtain the channel estimation $\hat{h}$, the method flow continues to block 514, representing OSD. If the receiver applies MMSE to obtain the channel estimation $\hat{h}$, the method flow continues to block 516, representing OMMSE. In some embodiments, at the transmitter 202 side, the subcarrier symbols are designed such that they do not assume small and/or large energy values.

After applying one of the blocks 512, 514, or 516, the result is an estimation of the transfer function of the propagation path, that is, of the local environment with the scattering object 106. Thus, the radar sensing path operates to extract a representation of this transfer function for the local environment based on correlation between the original OFDM symbol and the received OFDM symbol, and from this representation of the transfer function determine one or both of the range and velocity of scattering objects, such as scattering object 106, within the local environment, as described herein.

Figure 6:
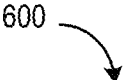
FIG. 6 is a diagram illustrating a plot of average target signal-to-noise ratios after applying signal processing for OFDM radar systems in accordance with some embodiments.
Figure 6:
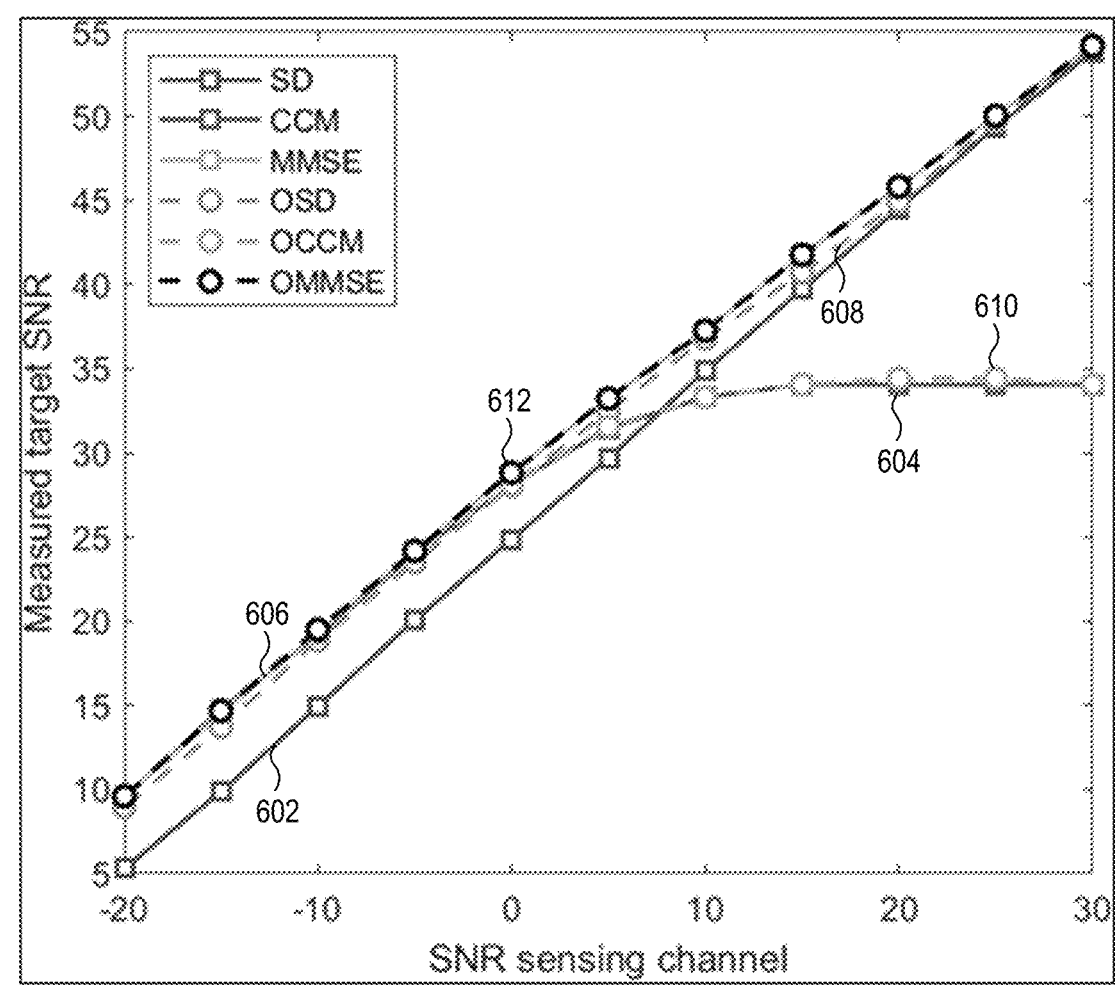

FIG. 6 illustrates an example plot 600 of average target signal-to-noise ratios after applying signal processing for OFDM radar systems in accordance with some embodiments. The plot 600 includes average target signal-to-noise ratios for a given channel signal-to-noise ratio for SD 602, CCM 604, MMSE 606, OSD 608, OCCM 610, and OMMSE 612. As shown in the example plot 600, at low channel signal-to-noise ratios, SD 602 is outperformed by CCM 604 and OMMSE 612. At high channel signal-to-noise ratios, SD 602 converges to OMMSE 612 and CCM 604 is outperformed by both SD 602 and OMMSE 612.

When applying OSD 608 by setting to zero constellation points below a first energy threshold (e.g., the first energy threshold is determined heuristically based on particular environmental characteristics and/or specific sensing applications and may be recalibrated based on changes in environmental characteristics and/or sensing applications), OSD 608 closely follows performance of OMMSE 612 even at low signal-to-noise ratios. When applying OCCM 610 by setting to zero constellation points above a second energy threshold (e.g., the second energy threshold is determined heuristically based on particular environmental characteristics and/or specific sensing applications and may be recalibrated based on changes in environmental characteristics and/or sensing applications), the performance of OCCM 610 closely follows CCM 604. Notably, although the performances of OSD 608, OCCM 610, and OMMSE 612 are similar to performances illustrated by other curves included in plot 600, removal of the subcarriers to be processed could lead to less overall complexity (e.g., a reduction in complexity).

Figure 7:
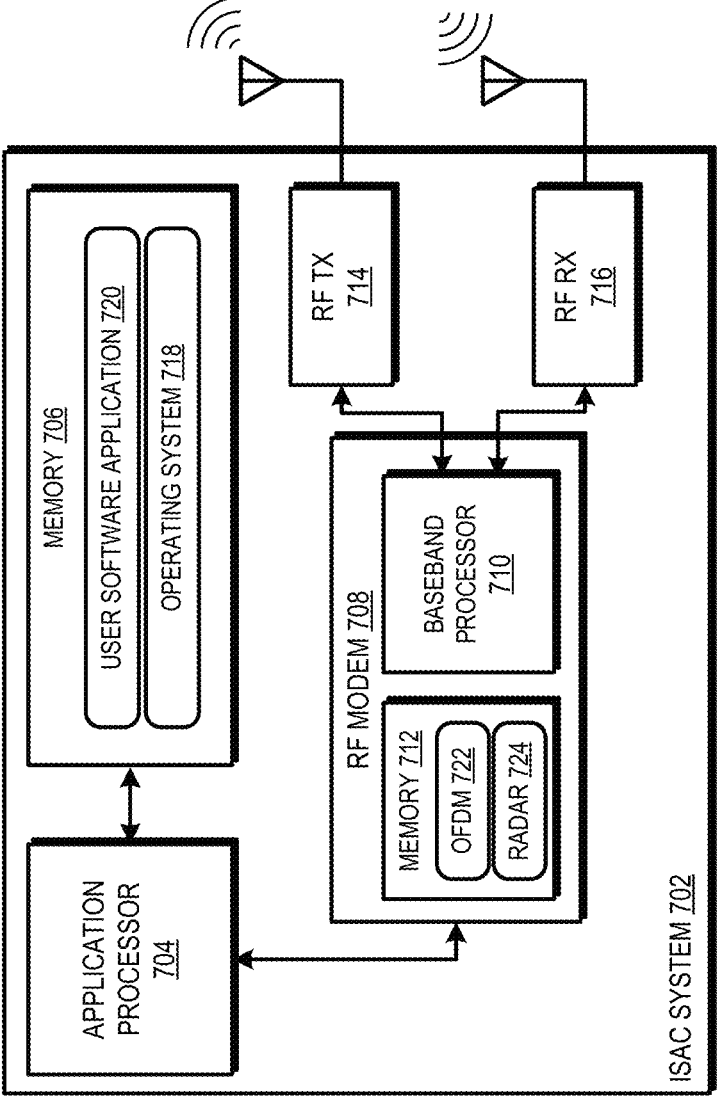
FIG. 7 is a diagram illustrating an example hardware implementation of an ISAC system in accordance with some embodiments.
Figure 7:

FIG. 7 illustrates an example hardware implementation 700 of an ISAC system 702 in accordance with some embodiments. In the depicted example, the ISAC system 702 includes at least one application processor 704 (e.g., a central processing unit (CPU) or other general processor), a system memory 706, one or more RF modems 708, a transmitter (TX) RF frontend 714 (e.g., one embodiment of the RF frontend 210) and a receiver (RX) RF frontend 716 (e.g., one embodiment of the RF frontend 216). Although a single RF modem 708 is illustrated as supporting operation of both RF frontends 714 and 716, in other embodiments each RF frontend may have a separate dedicated RF modem 708. The RF modem 708 includes a baseband processor 710 and a memory 712, which can include, for example, a Flash memory, non-volatile random-access memory (NVRAM) or other non-volatile memory, or static RAM (SRAM) or dynamic RAM (DRAM) or other volatile memory, or a combination thereof. Further, it will be appreciated that the ISAC system 702 can include a number of additional components omitted from FIG. 7 for ease of illustration including, for example, a transmitter system (e.g., including an encoder, a modulator, an OFDM generator, etc.), a radar sensing system (e.g., including one or more antennae, a duplexer, a radar transceiver, a radar signal processing component, a radar control component, etc.), a receiver system (e.g., including an OFDM demodulator, a decoder, a radar data processing component, etc.), one or more displays, one or more touchscreens, keypads, mice, touchpads, microphones, speakers, and other user input/output devices, one or more sensors, batteries or other power sources, graphical processing units (GPUs) or other coprocessors, and the like.

The application processor 704 executes executable instructions from a software stack that includes an operating system (OS) 718 and one or more user software applications, such as user software application 720, and which further can include protocol stacks executed by the baseband processor 710 of the RF modem(s) 708. The OS 718, through manipulation of the application processor 704, manages the general operation of the various hardware components of the ISAC system 702 as well as supports the execution of the one or more user software applications, with the executable instructions representing the OS 718 and the user software application typically accessed from system memory 706 for execution by the application processor 704.

Further, the memory 712 of the RF modem 708 stores one or more sets of executable instructions that, when executed by the baseband processor 710, manipulate the baseband processor 710 to perform various operations in accordance with one or more communication protocols associated with the air interfaces provided by RF frontends 714 and 716. These operations can include various OFDM-related operations performed by execution of OFDM software 722, such as the operations described above with reference to the components 206, 208, 212, and 214 and radar sensing operations performed by execution of radar sensing software 724. In other embodiments, one or more operations are performed by an application processor 704 (or a dedicated processor, such as a graphics processing unit, or GPU) executing software stored in the system memory 706. For example, the OFDM-related operations of the transmitter 202 and the receiver 204 may be performed at one or more RF modems 708.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

operating, by an integrated sensing and communication (ISAC) system, an orthogonal frequency division multiplication (OFDM) transceiver in full-duplex mode in a downlink communication phase;

generating, by the ISAC system, sensing symbols for an OFDM radar system by combining communication symbols and repetitions of the communication symbols; and attenuating, by the OFDM transceiver in the full-duplex mode, subcarriers of received sensing symbols for processing by the OFDM radar system by setting a subset of the subcarriers to approximately zero to increase a signal-to-noise ratio of the received sensing symbols.

2. The method of claim 1, wherein attenuating the subcarriers removes the subcarriers from the received sensing symbols.

3. The method of claim 1, wherein the subcarriers are attenuated at one or both of a transmitter and a receiver of the OFDM transceiver.

4. The method of claim 1, wherein the subcarriers are attenuated and complex conjugate multiplication (CCM) is applied.

5. The method of claim 4, wherein the subcarriers are attenuated based on having amplitudes that are greater than a high amplitude threshold.

6. The method of claim 1, wherein the subcarriers are attenuated and spectral division (SD) is applied.

7. The method of claim 6, wherein the subcarriers are attenuated based on having amplitudes that are less than a low amplitude threshold.

8. The method of claim 1, further comprising:

processing the received sensing symbols based on minimum mean square error (MMSE) estimation.

9. An integrated sensing and communication (ISAC) system comprising:

an orthogonal frequency division multiplication (OFDM) radar system configured to process sensing symbols comprising communication symbols and repetitions of the communication symbols; and an OFDM transceiver configured to:

operate in full-duplex mode in a downlink communication phase; and attenuate subcarriers of received sensing symbols for processing by the OFDM radar system by setting a subset of the subcarriers to approximately zero to increase a signal-to-noise ratio of the received sensing symbols.

10. The ISAC system of claim 9, wherein the subcarriers are attenuated at one or both of a transmitter and a receiver of the OFDM transceiver.

11. The ISAC system of claim 9, wherein the subcarriers are attenuated using complex conjugate multiplication (CCM) based on having amplitudes that are greater than a high amplitude threshold.

12. The ISAC system of claim 9, wherein the subcarriers are attenuated using spectral division (SD) based on having amplitudes that are less than a low amplitude threshold.

13. The ISAC system of claim 9, wherein attenuating the subcarriers removes the subcarriers from the received sensing symbols.

14. The ISAC system of claim 9, wherein the OFDM radar is configured to process the received sensing symbols based on minimum mean square error (MMSE) estimation.

15. A non-transitory computer-readable medium storing a set of executable instructions, the set of executable instructions to manipulate at least one processor to:

operate an orthogonal frequency division multiplication (OFDM) transceiver of an integrated sensing and communication (ISAC) system in full-duplex mode in a downlink communication phase;

generate sensing symbols for an OFDM radar system of the ISAC system by combining communication symbols and repetitions of the communication symbols; and attenuate subcarriers of received sensing symbols for processing by the OFDM radar system by setting a subset of the subcarriers to approximately zero to increase a signal-to-noise ratio of the received sensing symbols.

16. The non-transitory computer-readable medium of claim 15, wherein the subcarriers are attenuated using complex conjugate multiplication (CCM) based on having amplitudes that are greater than a high amplitude threshold.

17. The non-transitory computer-readable medium of claim 15, wherein the subcarriers are attenuated using spectral division (SD) based on having amplitudes that are less than a low amplitude threshold.

18. The non-transitory computer-readable medium of claim 15, wherein the set of executable instructions are configured to further manipulate the at least one processor to:

process the received sensing symbols based on minimum mean square error (MMSE) estimation.

\* \* \* \* \*